US008275707B1

(12) United States Patent
Boyd

(10) Patent No.: US 8,275,707 B1
(45) Date of Patent: Sep. 25, 2012

(54) METHODS AND SYSTEMS FOR NORMALIZED IDENTIFICATION AND PREDICTION OF INSURANCE POLICY PROFITABILITY

(75) Inventor: Mary J Boyd, Whitehouse Station, NJ (US)

(73) Assignee: The Chubb Corporation, Warren, NJ (US)

( * ) Notice: Subject to any disclaimer, the term of this patent is extended or adjusted under 35 U.S.C. 154(b) by 1629 days.

(21) Appl. No.: 11/251,167

(22) Filed: Oct. 14, 2005

(51) Int. Cl.
*G06Q 40/00* (2006.01)
(52) U.S. Cl. ............................................. 705/40; 705/4
(58) Field of Classification Search ...................... 705/40
See application file for complete search history.

(56) References Cited

U.S. PATENT DOCUMENTS

| | | | |
|---|---|---|---|
| 4,975,840 A | | 12/1990 | DeTore et al. |
| 5,712,984 A | | 1/1998 | Hammond et al. |
| 5,970,464 A | * | 10/1999 | Apte et al. ........................ 705/4 |
| 7,672,921 B1 | * | 3/2010 | Clay et al. ...................... 706/45 |
| 2002/0161609 A1 | | 10/2002 | Zizzamia et al. |
| 2003/0101080 A1 | | 5/2003 | Zizzamia et al. |
| 2003/0158924 A1 | * | 8/2003 | DeLegge ...................... 709/223 |
| 2003/0191672 A1 | * | 10/2003 | Kendall et al. .................... 705/4 |
| 2004/0024620 A1 | | 2/2004 | Robertson et al. |
| 2005/0171885 A1 | | 8/2005 | Christman et al. |

OTHER PUBLICATIONS

Insurance Geographics William M. Raichle, Ph.D. Insurance Services Office, Inc., New York, Jan. 2001.*
ChoicePoint, C.L.U.E. Personal Property how to read the report, Apr. 2001.*

* cited by examiner

*Primary Examiner* — Hani M Kazimi
*Assistant Examiner* — Chuks Onyezia
(74) *Attorney, Agent, or Firm* — Robert Gorman; Gorman Law Offices

(57) ABSTRACT

A process for identifying a normalized insurance quality index of present and prospective insurance policies for an insurance book that can be utilized to more accurately predict present and future profitability on a standardized basis.

19 Claims, 6 Drawing Sheets

| Model | Model Version | UserId | State Code | Comp Code | LP | BAP | AP | AAP | Tier | Territory | Eff Date | Exp Date | Rate Eff Date | Rate Exp Date |
|---|---|---|---|---|---|---|---|---|---|---|---|---|---|---|
| RNLDWL | 01.01 | U040541 | 01 | A | | 939 | 850 | 401 | 162 | 999 | 1/1/1900 | 6/19/2005 | 1/1/1900 | 12/31/9999 |
| RNLDWL | 01.01 | U040541 | 01 | B | | 900 | 811 | 362 | 123 | 999 | 1/1/1900 | 6/19/2005 | 1/1/1900 | 12/31/9999 |
| RNLDWL | 01.01 | U040541 | 01 | C | | 939 | 850 | 401 | 162 | 999 | 1/1/1900 | 6/19/2005 | 1/1/1900 | 12/31/9999 |
| RNLDWL | 01.01 | U040541 | 01 | D | | 868 | 779 | 330 | 91 | 999 | 1/1/1900 | 6/19/2005 | 1/1/1900 | 12/31/9999 |
| RNLDWL | 01.01 | U040541 | 02 | A | | 939 | 850 | 401 | 162 | 999 | 1/1/1900 | 6/19/2005 | 1/1/1900 | 12/31/9999 |
| RNLDWL | 01.01 | U040541 | 02 | B | | 939 | 850 | 401 | 162 | 999 | 1/1/1900 | 6/19/2005 | 1/1/1900 | 12/31/9999 |
| RNLDWL | 01.01 | U040541 | 02 | C | | 939 | 850 | 401 | 162 | 999 | 1/1/1900 | 6/19/2005 | 1/1/1900 | 12/31/9999 |
| RNLDWL | 01.01 | U040541 | 02 | D | | 908 | 819 | 370 | 131 | 999 | 1/1/1900 | 6/19/2005 | 1/1/1900 | 12/31/9999 |

FIG. 5

METHODS AND SYSTEMS FOR NORMALIZED IDENTIFICATION AND PREDICTION OF INSURANCE POLICY PROFITABILITY

BACKGROUND

Insurance underwriters have the ongoing problem of not being able to accurately predict or assess future underwriting risks in a given book of insurance policies, and in particular, are not able to do so in a way that further eliminates or reduces undesirable risk policies before they actually become a risk problem. Although risk scoring assists with this prediction, it is not always sufficient to answer the profitability problem and also introduces additional challenges to consistently answering the same. There are many reasons for this. First, typical scoring processes, which presumably address such indicia such as accident history, credit score, insurable asset type, locations, etc. can vary extensively, and even randomly, over time. This is problematic, because if indicia are to be used as risk assessments in the underwriting process, the inherent variability that may occur over time must be considered in the score to produce an accurate risk level assessment (whether positive or negative) for a given policy.

To compound this problem, these imperfect, (essentially) static scores are not perfectly analogous across macro- and micro-geographical conditions. Under these conditions, what may typically be considered an acceptable risk in, for example, the state of Massachusetts is not the same thing as an "acceptable" risk in Barnstable County, Mass., where the types and frequency of claims (e.g., in Barnstable County there may be a particularly high number of fraudulent auto accidents), when taken as a whole, are much more severe, and much greater in magnitude than elsewhere in Massachusetts. When taken on a macro level, categories of risk across the country (e.g., between one state to another state) are diluted by the inherent variability of risks particular to the many regions and sub-regions and the relative differences in scores. Even if one were to attempt to add surcharges or other static adjustments to policies on a countrywide or statewide level, this would not accurately predict the likelihood of policies becoming an unacceptable risk. Furthermore, downstream projected assessments of a given policy such as projected profitability, or "projected loss ratios" are distorted by these variations if not properly reflected in the score calibration.

SUMMARY OF THE INVENTION

It is therefore an object of the invention to provide a solution to this problem by affording a means to provide a more accurate and normalized prediction of policy risks within a book of business by using a dynamic, and highly reliable, measurement of future risks and the attendant profitability of policies within an insurance book.

It is further an object of the present invention to provide the above method in such a way as to avoid the usage of misleading raw scores, and to provide a normalized index that can be used by underwriters and other insurance industry staff to better predict and assess both present and future profitability.

This invention relates to a method, system, and computer product application that can be used to better predict the present and future profitability of both presently underwritten and prospectively underwritten policies in an insurance book.

More specifically, the present invention may be utilized to establish a quality index of present and prospective policies that effectively renders a normalized classification of policies on a nationwide, comprehensive basis and can be a tool for underwriters and others in the insurance industry to better assess the projected profitability of given policies as submitted.

One embodiment of the present invention relates to methods and systems for analyzing relevant policy data and generating a unique score, and then converting the score into a quality index for use on an individual and book-wide basis.

A further embodiment relates to methods and systems of providing the ability to direct policies to underwriters for review based upon certain underwriting conditions and the quality index, and to further generate context-specific reason codes with the quality index.

BRIEF DESCRIPTION OF THE DRAWINGS

FIG. 5 is an exemplary chart illustrating the result of a score to index conversion analysis and its resulting business rules. These rules are used to convert the score to an index so that it might be output to an underwriter or other user according to the inventive process.

DETAILED DESCRIPTION OF THE INVENTION

The present invention therefore relates to a normalized and improved model that employs a score to index tool for assessing policies on a countrywide and territory wide level. In accomplishing the above, one aspect of the invention therefore relates to a method, system, and computer program product that provides a novel score to index tool that can be employed to better predict the present and future profitability of both underwritten and prospectively underwritten policies. Thus, in one exemplary embodiment of the invention, the invention may be described as comprising a method for identifying a normalized insurance quality index of present and prospective insurance policies for an insurance book which can be instantiated or executed on an electronic apparatus such as a computer system, and/or executed on a computer readable medium executing the following steps of: identifying any eligible policies for scoring; establishing initial or refreshed scores for all of the eligible policies on the insurance book; performing an score to index conversion on the scores so as to generate the normalized insurance quality index; generating referrals of any given eligible policies based upon established referral rules; and outputting the normalized insurance quality index and said referrals.

In yet another exemplary embodiment of the invention, the invention may be described as employing a score to index conversion that is used to generate a normalized insurance quality index of policies for an insurance book that can be instantiated or executed on an electronic apparatus such as a computer system, and/or executed on a computer readable medium executing the following steps comprising: inputting the score for a set of policies; normalizing said scores within said set of policies across at least a premium variable; calculating a combined ratio for the said set of policies; calculating percentiles of said combined ratio of said set of policies; establishing groupings according to said percentiles; and establishing an index signifier for each of said groupings.

Figure 1:
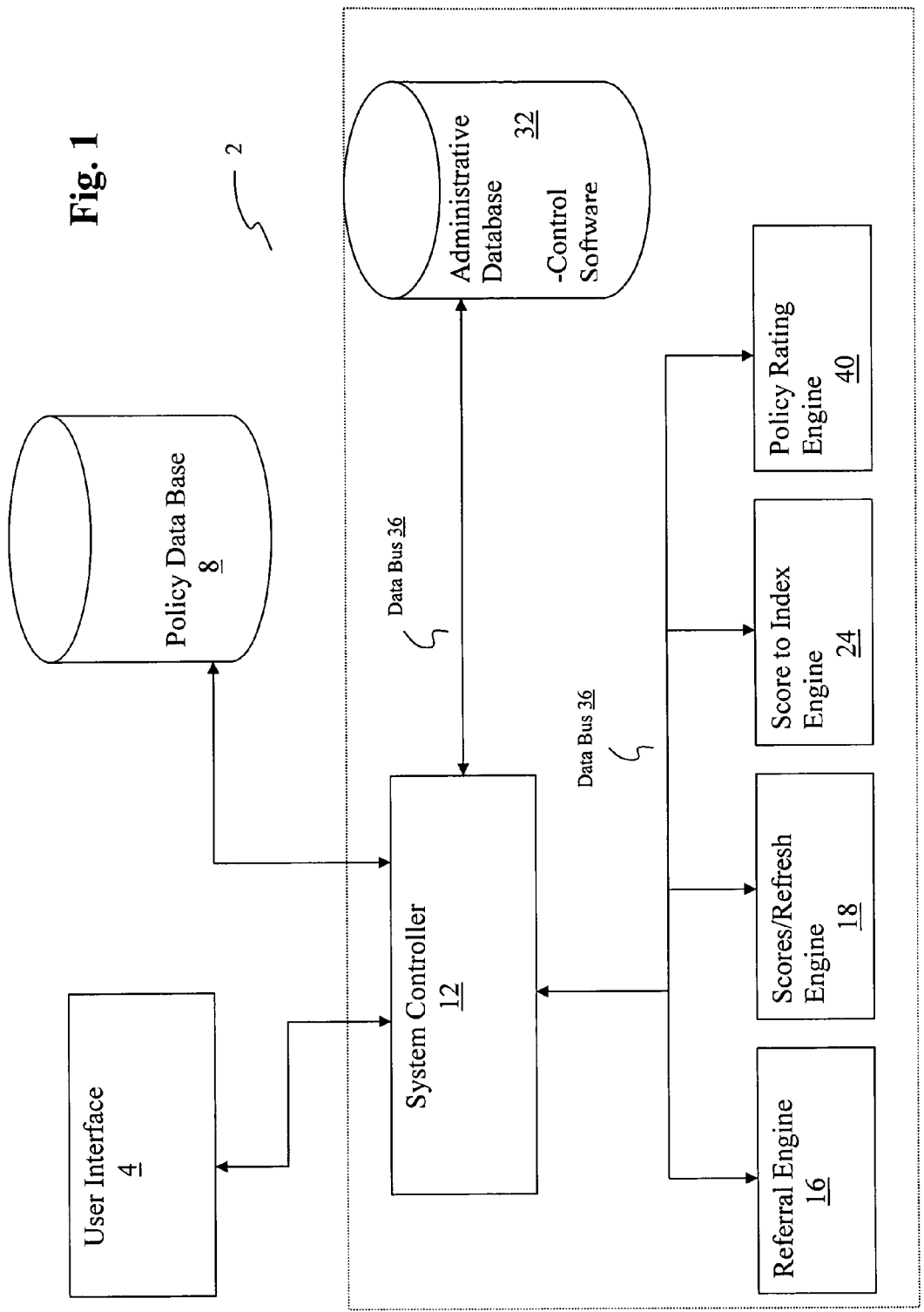
FIG. 1 is a generalized system level block diagram of an exemplary hardware system employing the inventive process described herein.

With reference now to FIG. 1, there is shown an exemplary computer-based system 2 for identifying a normalized insurance quality index of present and prospective insurance policies for an insurance book by collection, processing and manipulation of insurance policy data in accordance with one embodiment of the present invention. System 2 is seen to include an administrative database 32 and a policy database 8, a referral engine 16, a scoring/refresh engine 18, a score to index engine 24, and a policy rating engine 40, each connected to system controller 22 through a data bus 36. System controller 12 is further connected to a user interface 4, such as a graphical display device and keyboard. System 2 is therefore seen to include a system controller 12 connected through an appropriate interface to each of the above described components of system 2. When configured as such, system controller 12 receives insurance policy related data from policy database 8, and administrative data from administrative database 28, which includes administrative software and control instructions. In one exemplary embodiment, system controller 12 can comprise one or more appropriately sized computers, for example, an IBM server and client system running on an OS/390 operating system. Multiple computers may be located geographically proximate or remote from one-another and may comprise the same or different computer types. Hence, in one other exemplary type of system, controller includes for example IBM-compatible client or stand-alone computer systems running the Microsoft NT™ or XP™ operating system. However, as can be appreciated, many alternate computer systems operational to perform the functions described herein are known to those skilled in the art, ranging in size and capability from desktop computer systems to mainframe computers systems, the type and capability selected in a well-known manner based on performance requirements.

Furthermore, when configured as depicted in FIG. 1, system controller 12 is connected to a referral engine 16, a scoring/refresh engine 18, a score to index engine 24, and a policy rating engine 40 so that policy related data received from policy database 8 may be processed with the aid of each respective engine according to the illustrative scheme described hereafter. Policy rating engine 40 is used to assign appropriate pricing structures and individual premiums to policies before they have received a score. The purpose of the several engines (referral engine 16, scoring/refresh engine 18, and score to index engine 24) is as follows. Referral engine 16 is used to evaluate individual policies that are being processed by scoring/refresh engine 18 and score to index engine 24 according to different business rules that may require an underwriter to reassess the value of retaining a certain policy in the book, such that if a given policy meets certain industry standard and/or proprietary profit criteria relating to possible profit concerns, then the policy is flagged by the system as a "referral" so that it may be forwarded to an underwriter with the appropriate referral code or message. Scoring/refresh engine 18 is used to refresh, or assign raw scores to policies, whether they are initially assigned, or updated, as indicated in greater detail in FIGS. 2 and 4 hereafter. Scoring to index engine 24 is used to normalize raw scores that have been generated from divergent environments such as state, territory, writing company, etc. as described further herein, and converts the scores into standardized quality indexes that may be further grouped into broad classification groupings (as further shown in FIGS. 3, 5 and 6 hereafter).

Administrative database 32 and policy database 8 each comprise an appropriate combination of storage elements, including for example, magnetic, optical and semiconductor storage. Databases 32 and 8 may comprise one single or many multiple, geographically diverse databases, providing local storage, remote storage and/or distributed storage amongst various storage facilities in various geographical locations. In one embodiment, administrative database 2 and policy database 8 may be IBM IMS™ databases, or any other brand or model of database as known in the art, including smaller variants, such as memory sources that may reside on a server or a personal computer. Accordingly, the appropriate selection of the entirety of database resources is made in accordance with system requirements in a well-known manner. Data bus 36 comprises one or more appropriate internal or external high-speed data buses, many of which are known in the art.

By way of further general illustration, administrative database 32 includes a user access information and control software 60 as may be well understood by those skilled in the art. It will be understood that the present invention contemplates appropriate human interactions through user interface 4 and in various other respects where human intervention, direction, control or the like is appropriate to the operation of system 2. Policy database 8, can contain many different types of data, including industry standard data, such as policy type, insured asset, policy holder demographics, accident history, etc., as may be known in the art. It will be understood that policy data may be processed in many different manners for many different uses. Human viewing and analysis, for example, may be facilitated by system controller 12, as required by current business practice. For purposes of scoring, refreshing and index to scoring conversion, the inventive methodology described herein may be performed by computer operations as known in the art in order to retrieve and process data from the databases 32 and 8, but may also be configured so as to work with commercially available analytics software, such as SAS Analytics software available from SAS Software, Cary, N.C. As can be appreciated, policy data and the resulting scores and quality indexes are typically processed for human viewing and visual analysis, but may also be processed for computer-controlled analysis. The actual form of user interface 4 can comprise any suitable user interface from a simple display terminal to a desktop computer, workstation, or mainframe computer with an appropriate user interface.

The inventive computer program product for executing the above described invention outputs useful information such as the quality index described herein. This product may be embodied in computer any manner of readable code, and may be contained on any computer readable medium, such as a hard drive (whether stand-alone PC based, or remote server), disk, CD, etc. When installed as such, the inventive computer program product act to initialize the system controller 12 for controlling the process flow, and for calling and receiving data from policy database 8 so that the various engines 16, 18, 24, and 40 may transform the data from policy database 8 into a qualitatively different and more useful type of information that can be formatted as output signals that can be displayed on user interface 4. As such, the technical effect is such that when the signals are output in accordance with the above, the tangible, useful result is that present and/or prospective insurance policies may be better planned and/or analyzed by underwriters and/or other insurance staff so as to identify the most profitable policies for inclusion in a given insurance book of business, and to eliminate or re-classify less profitable policies on an ongoing basis and additionally, so that desirable business may be identified early on so that problem business may be flagged as soon as possible, in some cases before it becomes a "profitability problem".

Figure 2:
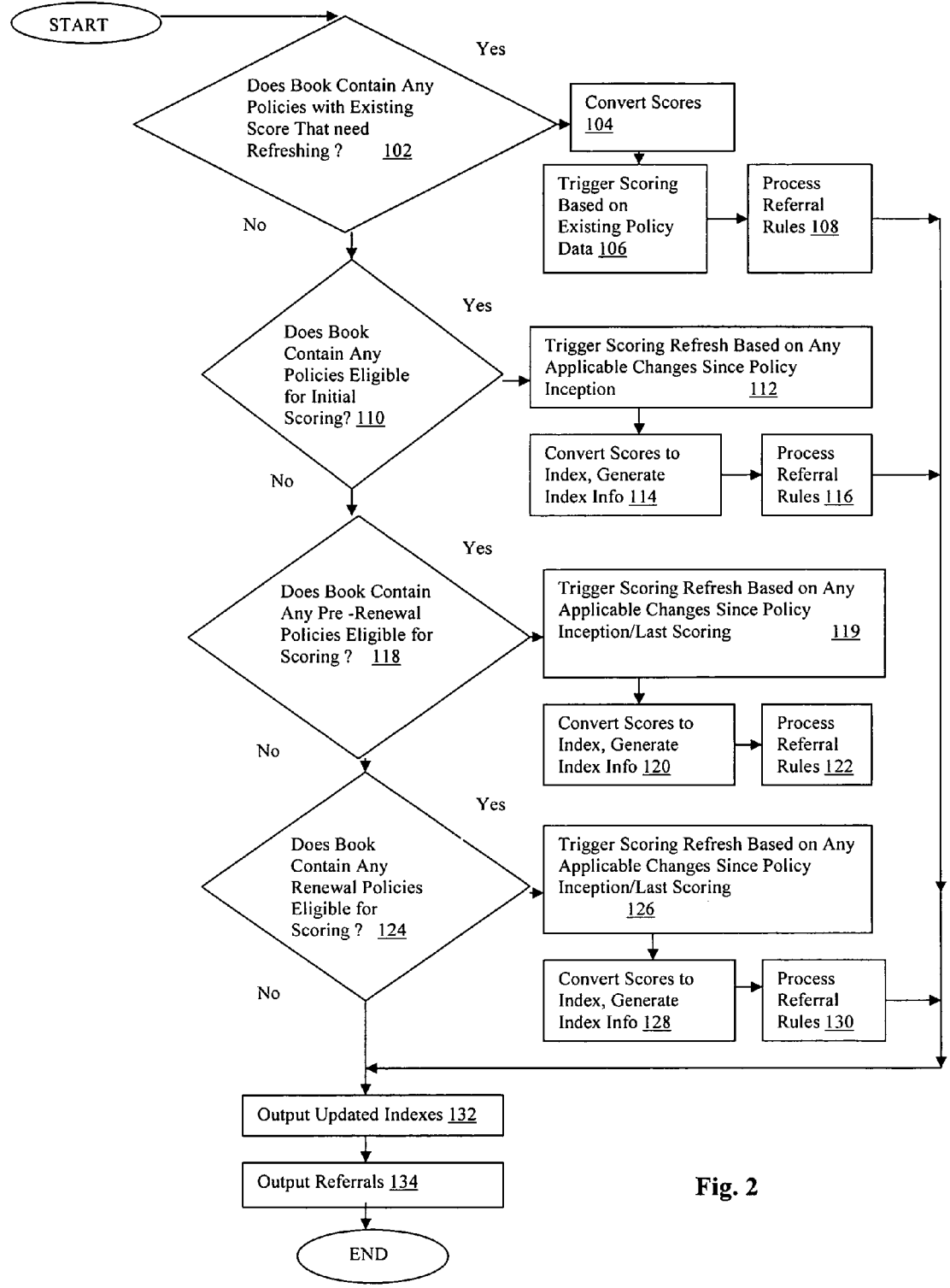
FIG. 2 is an exemplary flow diagram showing one way in which the overall inventive process may be structured so as to afford a dynamic scoring, score updating, and score to index conversion of updated scores for policies at all different stages of the underwriting process.

Turning then to FIG. 2, there is shown a generalized process flow diagram depicting an exemplary recitation of the steps involved in one embodiment of the invention. As depicted therein, the inventive methodology screens the entire book of insurance policies, including any prospective policies that may be eligible for underwriting, to see whether there are any policies that need either an initial score assigned (step 110), or that need refreshing (e.g., updated scoring) (step 102). In either case, the scores thereafter will be converted to an index (steps 104, 114) (as further described hereafter in FIG. 3), and then processed for referral rules (steps 108, 116), then output (steps 132, 134) to a given user.

When processing for referral rules (steps 108, 116), all eligible individual policies will be scored. Whether a policy is eligible will be determined by many things as may be appreciated by those skilled in the art, but in one embodiment, those policies that have the following system qualifiers attached to them will not be deemed "eligible": policies marked "On Hold"; policies emanating from the "System Error In-Box"; policies/risks marked for Do Not Renew ("DNR") after the DNR is effective; policies marked in error (e.g., those in a renewal in-box); those policies having expired terms (where "expired"=actual expiration date of term); those marked as special change cancel; those marked as cancel by "Other" reason (e.g., by producer and/or insured request); those marked as cancel for non-pay; those marked as "Void" transactions; and those policies whose data comes from non-compatible and/or any system other than the present one. When processing, the eligible policies will be assessed for specifics such as whether they contain any indicators relating to, or evidence of: high claim frequency and/or size; size of risk; year constructed; dwelling protection characteristics; non-pay cancellation history; number of mortgagees; etc. Ideally, a referral output will take the form of a referral message, and is typically (although not exclusively) associated with lower profitability and/or potential "problem" policies. In essence, the referral will provide an underwriter or other personnel with a qualitative assessment of the exposure of the given policy, providing key information as to what caused the low (or possibly, high) profitability projection reflected by the quality index assigned to that policy. The underwriter or other user can employ the information reflected by the referral and/or reason messages to determine whether to non-renew, re-tier, or take any other possible action on the policy in question, and can further utilize this information to look up projections from any other policies connected with the customer. It is important to recognize that one of the advantages of this referral message is that, when produced in tandem with the above described dynamic refreshing of scores and/or score conversions, it will trigger review of policies on a dynamic (e.g., ongoing) basis before a given policy becomes a problem, and before the profitability drain becomes compounded.

Accordingly, in order provide a truly dynamic type of performance that affords a superior and highly accurate picture of both individual policies and entire books of business, the above steps are generally repeated at automatic, frequent intervals, such as at the exemplary pre-renewal stage (step 118), and the exemplary renewal stage (step 124). Provision of such empowers underwriters to be proactive, instead of merely being reactive in writing policies by providing them with an improved predictive mechanism by which they can assess individual policies before they become a "problem", rather after they have become a "problem". Additionally, because the present invention provides a true picture of policies through the provision of a normalized quality index, business planners in the insurance industry are also better able to assess a whole book, and if need be, are better positioned to be able to "prune" through entire books of policies in order to maximize profitability.

Figure 3:
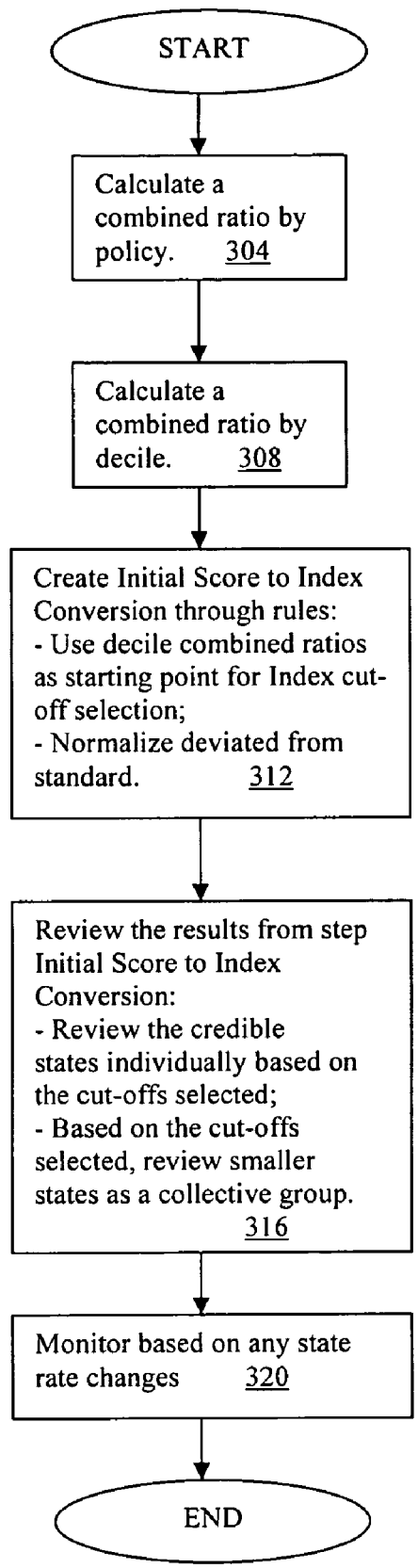
FIG. 3 is an exemplary flow diagram showing one way in which the inventive process may yield a quality index.

Turning then to FIG. 3, is a depiction of the particular steps that might be employed in one exemplary embodiment of the score to index conversion referenced at steps 104, 114, 120, and 128 in FIG. 2. First in this process is preparatory step of "data preparation" modeling is done on the data set for the analysis and conversion. As can be appreciated, there are many ways of preparing the data from policies, but in one embodiment, an approach to prepare the data set through modeling would be to designate a discreet past time period in policy history which will accurately reflect a generalized claims history and the ultimate costs involved, so as to eliminate incomplete, outdated, as well as data that is too recent (e.g., not yet fully developed). Thus, when preparing the data, the resulting modeling data set might have the following adjustments to the sampled history: past premiums are on-leveled to reflect current rates; premiums that may have been deviated by a discounted writing company are brought to a standard rate level; loss histories are trended and adjusted for large losses and catastrophes. Once prepared in this manner, FIG. 3 begins with a calculation of a combined ratio by policy (step 304), which is a profit to loss calculation based on the premium and losses mentioned above, and through the addition of additional expenses. Next, a calculation of a combined ratio by a percentile, or in one embodiment, so as to form groupings according to a given percentile (decile, quartile, etc.) (step 308) is performed. This is done by taking the above described losses and expenses, and the applicable premium(s) and aggregating them on a nationwide basis by percentile segmentation, and the combined ratios are again calculated for a given number of buckets or classifications. It is important to note that the exact percentile employed may be any given percentile or grouping chosen (typically a maximized number of percentiles or groupings may be considered more desirable for purposes of accuracy) as may be limited by system processing and actuarial dataset credibility constraints. Subsequently, initial score to index conversion rules (step 312) are created by implementing the percentile combined ratios for use as a starting point for an index cut-off selection. In doing so, the standard company cut-offs are selected first, and the deviated (e.g., that which is lower rated or discounted when compared to a standard company premium) company's cut-offs may fall out based on a reduction in cut-off score as a multiple of the deviation of premium. This will reflect the difference in premium charged in the various companies and allows future changes in company deviations to flow through to the convert to index process. Thus, as seen in the illustrative tables:

TABLE I

| Company Type | Score | Combined loss/profit ratio |
|---|---|---|
| "Standard" | 850-1000 | >110% |
| "Preferred" | 850-1000 | >115% |
| "Most preferred" | 850-1000 | >130% |

TABLE II

| Company Type | Score | Combined loss/profit ratio |
| --- | --- | --- |
| "Standard" | 850-1000 | >110% |
| "Preferred" | 820-1000 | >110% |
| "Most preferred" | 790-1000 | >110% |

As understood, Table I above represents the distortion of a combined loss to profit ratio before implementation of the conversion normalization. As can be seen, in Table I, a "Standard" (e.g., non-discounted) writing company will reflect a combined loss to profit ratio of 110% or worse for those policies that have a score of 850-1000, while the companies that comparatively discount in increasing degrees for theoretically better and best performing policies ("Preferred" and "Most Preferred", respectively) will show higher (e.g., worse) combined loss ratios of 115% and 130%, respectively. In order to normalize this for further analysis, and as depicted in Table II above, the score cut-offs will be adjusted for the "Preferred" and "Most Preferred" companies so that they will have the same combined loss ratios of 110% as the "Standard" companies. Of course, further calculations and variants may be further implemented in the above, to include, for example, adjusting cut-offs according to territory, state, etc. so as to reflect the widely varying catastrophe loads in catastrophe-prone areas.

With continuing reference to FIG. 3 then, the next step includes reviewing the results for the initial score to index conversion (step 316), as described above, such that for any given cut-offs selected, an individual review (meaning analysis to determine whether the projected loss ratios for each index category reflect the targeted projected loss ratio for that index category) is made of actuarially credible states individually, while proceeding to review the smaller states as a collective group. The states without credible data may then use common cut-off points and follow the same rules for company deviations. In one embodiment, the goal might be to have a combined ratio greater than 100% for both the BAP and LP segments (as described hereafter), with the LP segments having a worse combined ratio than that of the BAP segment. Thereafter, monitoring (step 320) is conducted to assess for subsequent alterations in the data, such as changes in the individual state rates, overall profitability, etc. so as to monitor the above-described convert to index cut-off points for needed revisions stemming therefrom.

Figure 4:
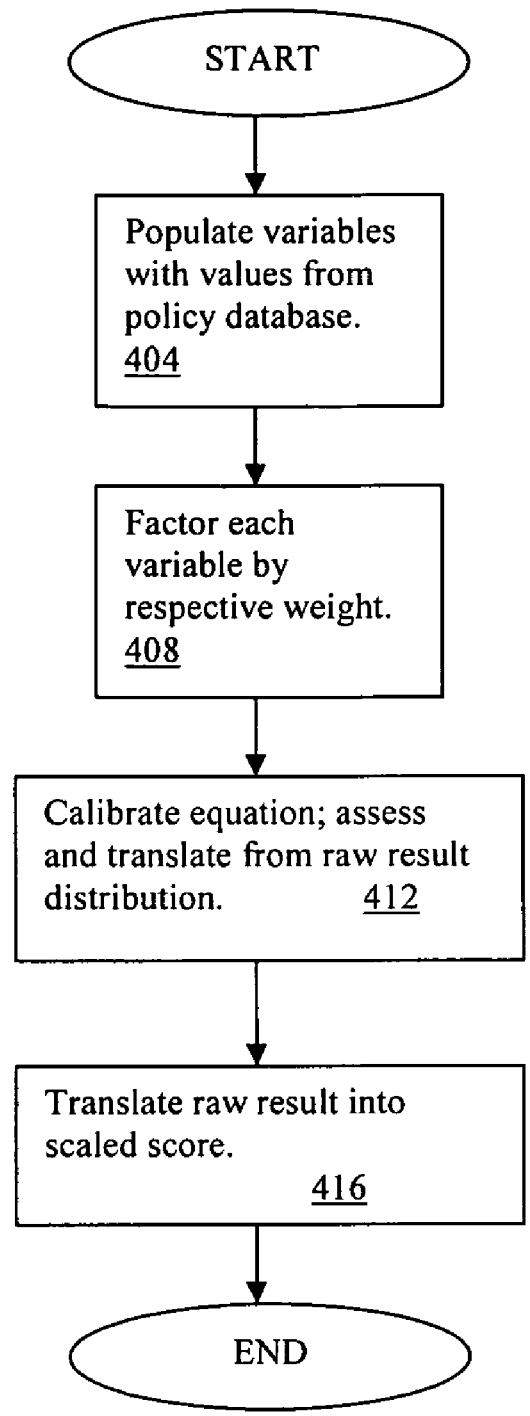
FIG. 4 is an exemplary flow diagram showing one way in which the inventive process may establish scores for all policies in need of score refreshing.

With attention now to FIG. 4, there is seen a depiction of the particular steps that might be employed in one exemplary embodiment of the score generation and refreshing referenced at steps 106, 112, 119, and 126 in FIG. 2. Each location or residence on a policy will be considered a unique risk, whereas information for say, all automobiles on a given policy will be combined and evaluated as a single risk, and therefore, will yield a single score per risk. This removes anomalies that may result when writing risks separately, and provides a better basis for the inventive score to index conversion by yielding a truer set of scores that can be further used to be input into the score conversion process. The input to scoring engine 18 will be a combination of historical and summarized data, real time policy data, and third party data information such as census information, weather data, zip code information, billing information, etc., and may be done in batch configurations (say, at an initial score event, pre-renewal event, and renewal event, but may be done otherwise, such as at least monthly), or conjunctively, on a request basis. The extracted data from policy database 8 will be fed into a subset of the scoring engine, and the product will be historical and summary tables that have been analyzed according to the inventive steps described herein (as executed by an exemplary analytical program such as SAS) so that it can be input into the score to index engine 24. At the time of a score request or trigger, the score to index engine 24 converts the numeric score for a given policy and converts it to a normalized output that may be symbolized in a categorical range for an index as described herein. As specifically depicted in FIG. 4, in one illustrative embodiment, the score generation begins with the step of populating variables with values (step 404) from policy database 8. Next, each variable will be weighted (step 408) by multiplying by a factor relative to a subjective assessment of the importance of that particular variable to the projected profitability. Thus, by way of just one illustrative equation that one might employ in executing steps 404 and 408 above, we would express this as where number of claims in the experience period, claim dates, claim amounts paid, and premium paid on the policy term, signify frequency of loss, recency of loss, severity of loss, and loss ratio respectively. Thereafter, a calibration (step 412) is made of the equation by assessing or translating the scores from the raw result distribution into a scale, such as 1-1000, with 1 being the absolute most desirable policy, and 1000 being the absolute least desirable policy. Thus, for any numerical values generated from execution of the above exemplary equation, one might statistically segment the entire set of values that might exist in a book into a given number (for example, 10) of different buckets with equivalent distributions. When provided as such, the scaled scores are then able to be normalized into the above-described fashion.

Figure 6:
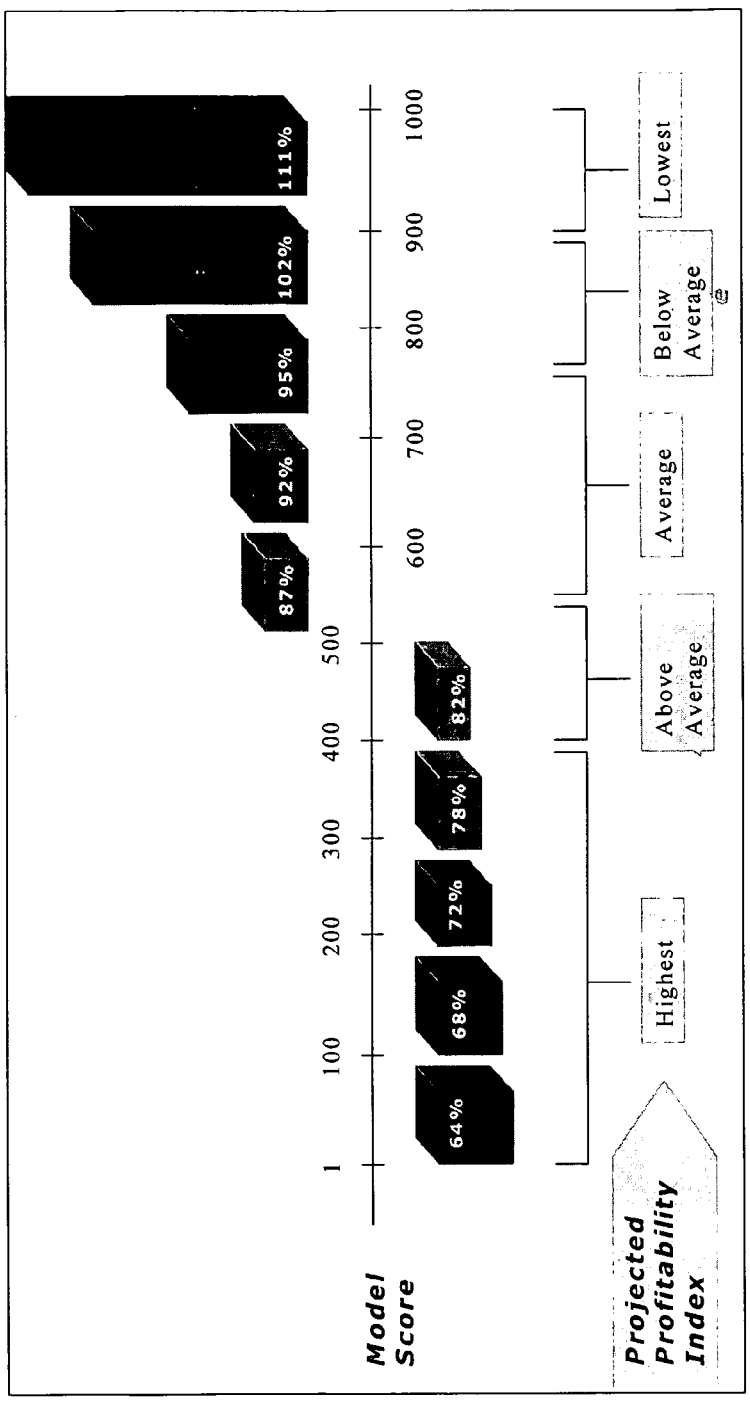
FIG. 6 is an exemplary chart illustrating the result of a score to index conversion according to the inventive process.

Thus, as described above, system 2 may typically be used by underwriters as an aid in helping them make underwriting decisions, and may also be utilized by insurance business analysts, or any others in the insurance business who may need to collect, process and distribute individual policy and book-wide data and indexes. FIGS. 5 and 6 depict two illustrations of an exemplary application of the inventive system and methodology. FIG. 5 depicts an exemplary view of the inventive score to index output on a typical policy. While not meant to be a limitation on the potential application of the inventive system and methodology, FIG. 5 illustratively shows how a user might view the output of the inventive processing of an individual policy at user interface 4. When viewed in the context of FIG. 5, an underwriter or other user might view specifics such as the type of policy (e.g., auto, home, etc.) in column 504, program version in column 508, information source in column 512, state of policy in column 516, company pricing level (e.g., discount, below average, average, above average, etc.) in column 518, score normalization across four (or possibly more) sub-columns of quality indexes (e.g., LP("Low Profitability"), BAP("Below Average Profitability"), AP("Average Profitability"), AAP("Above Average Profitability")) in column 522, tier in column 526, territory in column 530, and relevant dates pertaining to policy and rate in column 534.

As can be seen by the different quality index groupings in the sub-columns in column 522, the inventive system and methodology normalizes for different variable factors such as policy discounting across different companies in column 518, different states in column 516, etc. such that, if say, in the first row of FIG. 5, company code "A" represents a "most discounted" company, when compared to say, company code "B" (which is, say, classified as a only a slightly or lesser discounted company), a policy would need a raw score of 162 or better in order to receive a quality index classification as "AAP" (Above Average Profitability), but if insured through a company code "B" company (e.g., a company that discounts less than a company code "A" company), then the policy need only have a raw score of 91. By recognizing that the same policy may be written by different companies at different premiums (and by implicitly recognizing that this ultimately affects any given calculation of "profitability" because a lower premium may be received from discounted insurance companies), then the system compensates for this and other discrepancies, such as state, terrritory, etc. through the inventive normalization of scores into different quality indexes by establishing disparate "cut-offs" for the given policy to be included in each respective quality index and classification ranges. The mechanism by which this normalization is processed is described herein in relation to the description of FIG. 3, above.

When processed in accordance with the above, the quality index as generated by the above-described score to index conversion tool reflects the loss to profitability ratio for a given policy relative to a countrywide average projected loss ratio of the respective data sets (e.g., whether auto, home, etc.) modeled. Accordingly, the result will reflect a measurement of the relative scale versus absolute value of the policy. By way of illustrative example, the output of a model might range from 1 (best) to 1000 (worst), whereby the score output is based upon a countrywide derived model that evaluated each exposure at the standard (e.g., most expensive) rate in each state, in order to provide a consistent measure that would reflect the projected profitability across the country given state (an territory) specific nuances. In doing so, it is not necessary to offer just a simplistic state specific calibration for particulars such as rate adequacy (by state, territory within a state, writing company/rate level within a state, catastrophe exposure, shock/extreme loss exposure due to non-catastrophic events, etc.). Continuing further with the exemplary model ranges, in a hypothetical example between two identical home policies having the same raw score of say, 750 in the above scale, but happen to be written is two completely different states, say Michigan and New York, one would evaluate (under prior art standards) the two policies to be the same exposure, and therefore equally desirable policies. However, in the inventive process, in addition to providing for a superior, and more dynamic raw score, any resulting score is normalized so as to provide a truer picture of the actual desirability of the policies. When processed according to the inventive methodology, one might see that the score to index conversion takes the raw score, and after refreshing it to account for any recent changes relevant to the policy, projects the profitability by normalizing on the above-mentioned national level, for differences in discount policies, relative state differences (say, the typically more severe Michigan weather when compared to New York), and provides an output of a projected loss to profitability ratio such that the Michigan home might have a projected loss ratio of say, 120%, while the New York home might have a projected ratio of say, only 98%. Despite the initial similarity in raw scores, the New York home would actually be predicted to be a more desirable (e.g., more profitable) policy to underwrite because it had a better projected loss to profitability ratio than the Michigan policy. In addition, this normalization has the added benefit that, when the projected profitability is assigned across the board through all policies in an insurance book, it is possible to tally up all of the policies that fit within the respective quality index groupings or categories (illustratively depicted as HP (Highest Profitability)/AAP (Above Average Profitability)/AP (Average Profitability)/BAP (Below Average Profitability)/LP (Low Profitability) in FIGS. 5 and 6) of the whole book.

Turning then specifically to FIG. 6, shown is a further exemplary application of one embodiment of the invention as applied across an entire book of insurance policies. By converting the cores into quality indexes as described above, an entire book of business (rather than just the application on a micro level on individual policies) may also be assessed on a macro level so that, in addition to maximizing individual policy profitability by providing a truer predictive picture of individual policy profitability and risk classification, the overall distribution of all policies may collectively be analyzed for future profit maximization book-wide. Thus, when all of the policies for a book are scored and converted to fit within a range that will provide a respective quality index, they may then be amalgamated into their respective groupings or categories (depicted as HP (Highest Profitability)/AAP (Above Average Profitability)/AP (Average Profitability)/BAP (Below Average Profitability)/LP (Low Profitability) across the entire book of insurance business. When insurance business analysts have access to a comprehensive distribution profile (as illustratively depicted in FIG. 6) for all of their business, they may then be able to better plan how to reallocate their book in such a way as to retain more profitable segments of their book, through such techniques as pruning their lesser profitable segments of their book with the assistance of the dynamic assessment of each policy at regular intervals, such as the pre-renewal stage, renewal stage, etc., as further described herein in FIG. 2. Thus, if a given underwriting company decides that it wants to show an overall increase of loss ratio of say, 2%, then it may undertake certain system wide activities, such as targeting an additional x % of lowest relative profitable policies for non-renewal, and another y % of other policies for re-tiering, and may aggressively target z number of prospective policies of a certain assessed quality index for underwriting in order to reach that given goal of a book-wide 2% increase in loss to profitability ratio.

It will be appreciated that, in contrast to the prior art, the application of the above described present invention, whether on a macro- or micro-level, provides the significant advantages described herein above. There has thus been provided new and improved methods and systems for receiving, processing, analyzing and outputting insurance policy related data. The invention uses the power of normalized and improved predictive modeling of the loss ratio of insurance policies in order to provide a superior approach to policy and book management.

Although the present invention has been described in considerable detail with reference to certain preferred embodiments thereof, numerous other versions are possible. Therefore the spirit and scope of the appended claims should not be limited to the description and the preferred versions contain within this specification.

I claim:

1. A process on a computer for identifying a normalized insurance quality index of insurance policies, said process comprising:

establishing, through use of a server system controller, scores for said insurance policies, said scores being established from raw data representing at least some of said insurance policies;

performing a score to index conversion on said scores to generate said normalized insurance quality index, wherein said step of performing score to index conversion includes transforming, with use of said server system controller, said scores being established from raw data representing at least some of said insurance policies into output signals for display as a predictive index of said normalized insurance quality index, said transforming of said scores being established from raw data representing at least some of said insurance policies into output signals for display dynamically as a predictive index of said normalized insurance quality index further including the process comprising:
(i) refreshing, through use of said server system controller, said scores to account for any recent changes relevant to said insurance policies; and
(ii) projecting, through use of said server system controller, profitability by national level from at least the following differences including: differences in discount policies, differences between books of business, different writing companies, different premiums, projected profitability by territory, projected loss ratio, and different territory within a state so as to provide an output of a predicted desirability of said at least some of said insurance policies; and
outputting, through use of said server system controller, into a visual depiction, said normalized insurance quality index for appropriate human interaction, said outputting further comprising at least the steps of providing said output of said predicted desirability from said step of projecting profitability, of said at least some of said insurance policies, and assessing, by an underwriter according to said predicted desirability of said at least some of said insurance policies, at least some of said insurance policies for either issuance, re-tiering, or non-renewal.

2. The process of claim 1, further comprising the steps of:
identifying said insurance policies that are eligible for scoring;
generating referrals of said eligible policies based upon established referral rules; and
outputting said referrals.

3. The process of claim 2, wherein said step of performing a score to index conversion on said scores to generate said normalized insurance quality index further comprises the following steps:
inputting at least one score for a set of policies;
normalizing said scores within said set of policies across at least a premium variable;
calculating a combined ratio of said set of policies;
calculating percentiles of said combined ratio of said set of policies;
establishing groupings according to said percentiles; and
establishing an index signifier for each of said groupings.

4. The process of claim 3, wherein said step of establishing groupings according to said percentiles is done so as to render a maximized number of groupings from said percentiles in accordance with system processing and actuarial dataset credibility constraints.

5. A non-transitory computer readable medium containing thereon instructions operative to control the operation of a computer system to perform the steps of:
scoring;
establishing scores for said insurance policies;
performing an score to index conversion on said scores to generate said normalized insurance quality index by transforming of said scores being established from raw data representing at least some of said insurance policies into output signals for display dynamically as a predictive index of said normalized insurance quality index further including the steps comprising:
(i) refreshing said scores to account for any recent changes relevant to said insurance policies; and
(ii) projecting profitability by national level from at least the following differences including: differences in discount policies, differences between books of business, different writing companies, different premiums, projected profitability by territory, projected loss ratio, and different territory within a state so as to provide an output of a predicted desirability of said at least some of said insurance policies; and
outputting said normalized insurance quality index, said outputting further comprising at least the steps of providing said output of said predicted desirability of said at least some of said insurance policies for use in assessing according to said predicted desirability from said step of projecting profitability, of said at least some of said insurance policies, at least some of said insurance policies for either issuance, re-tiering, or non-renewal.

6. The non-transitory computer readable medium of claim 5, wherein said step of performing an score to index conversion on said scores to generate said normalized insurance quality index further comprises the following steps:
identifying said insurance policies that are eligible for scoring;
generating referrals of said eligible policies based upon established referral rules; and
outputting said referrals.

7. The non-transitory computer readable medium of claim 6, wherein said step of performing a score to index conversion on said scores to generate said normalized insurance quality index further comprises the following steps:
inputting at least one score for a set of policies;
normalizing said scores within said set of policies across at least a premium variable;
calculating a combined ratio of said set of policies by scored policy;
calculating percentiles of said combined ratio of said set of policies;
establishing groupings according to said percentiles; and
establishing an index signifier for each of said groupings.

8. The non-transitory computer readable medium of claim 7, wherein said step of establishing groupings according to said percentiles is done so as to render a maximized number of groupings from said percentiles in accordance with system processing and actuarial dataset credibility constraints.

9. A computer based system for identifying a normalized insurance quality index of insurance policies, said system comprising:
a server system controller for use in establishing scores for said eligible policies and
a for use in performing an score to index conversion on said scores to generate said normalized insurance quality index by transforming of said scores being established from raw data representing at least some of said insurance policies into output signals for display dynamically as a predictive index of said normalized insurance quality index further including executing the steps comprising:
(i) refreshing, through use of said server system controller, said scores to account for any recent changes relevant to said insurance policies; and
(ii) projecting, through use of said server system controller, profitability by national level from at least the following differences including: differences in discount policies, differences between books of business, different writing companies, different premiums, projected profitability by territory, projected loss ratio, and different territory within a state so as to provide an output of a predicted desirability of said at least some of said insurance policies from said step of projecting profitability; and outputting, through use of said server system controller, said normalized insurance quality index by providing said output of said predicted desirability of at least some of said insurance policies for use in assessing according to said predicted desirability of said at least some of said insurance policies, at least some of said insurance policies for either issuance, re-tiering, or non-renewal.

10. The computer based system of claim 9, wherein said for performing a score to index conversion on said scores to generate said normalized insurance quality index further comprises:
   identifying said insurance policies that are eligible for scoring;
   generating referrals of said eligible policies based upon established referral rules; and
   outputting said referrals.

11. The computer based system of claim 10, wherein said server system controller for performing a score to index conversion on said scores to generate said normalized insurance quality index further comprises:
   providing said server system controller for use in: inputting at least one score for a set of policies;
   normalizing said scores within said set of policies across at least a premium variable;
   calculating a combined ratio of said set of policies by policy;
   calculating percentiles of said combined ratio of said set of policies;
   establishing groupings according to said percentiles; and
   establishing an index signifier for each of said groupings.

12. The process of claim 11, wherein said establishing groupings according to said percentiles further comprises rendering a maximized number of groupings from said percentiles in accordance with system processing and actuarial dataset credibility constraints.

13. A computer based system for identifying a normalized insurance quality index of insurance policies, said system comprising:
   a server system controller;
   a memory connected to said server system controller, said memory storing instructions operative with said server system controller to perform the steps of:
   establishing scores for said insurance policies;
   performing a score to index conversion on said scores to generate said normalized insurance quality index by transforming of said scores being established from raw data representing at least some of said insurance policies into output signals for display dynamically as a predictive index of said normalized insurance quality index further including the steps comprising:
   (i) refreshing said scores to account for any recent changes relevant to said insurance policies; and
   (ii) projecting profitability by national level from at least the following differences including: differences in discount policies, differences between books of business, different writing companies, different premiums, projected profitability by territory, projected loss ratio, and different territory within a state so as to provide an output of a predicted desirability of said at least some of said insurance policies from said step of projecting profitability; and
   outputting said normalized insurance quality index, said outputting further comprising at least the steps of providing said output of said predicted desirability of said at least some of said insurance policies for use in assessing according to said predicted desirability of said at least some of said insurance policies, at least some of said insurance policies for either issuance, re-tiering, or non-renewal.

14. A computer based system of claim 13, wherein said step of performing an score to index conversion on said scores to generate said normalized insurance quality index further comprises the following steps:
   identifying said insurance policies that are eligible for a score to index conversion;
   generating referrals of said insurance policies based upon established referral rules; and
   outputting said referrals.

15. The computer based system of claim 14, wherein said step of performing an score to index conversion on said scores to generate said normalized insurance quality index further comprises the following steps:
   inputting at least one score for a set of policies;
   normalizing said scores within said set of policies across at least a premium variable;
   calculating a combined ratio of said set of policies;
   calculating percentiles of said combined ratio of said set of policies;
   establishing groupings according to said percentiles; and
   establishing an index signifier for each of said groupings.

16. The process of claim 15, wherein said step of establishing groupings according to said percentiles is done so as to render a maximized number of groupings from said percentiles in accordance with system processing and actuarial dataset credibility constraints.

17. A process on a computer for converting a score of an insurance policy for an insurance book into a normalized quality index, said process comprising the following steps:
   transforming, with use of a server system controller, said score of an insurance policy from raw data representing physical data chosen from the group comprising at least location and property description of said insurance policies, into output signals for display as a predictive index of said normalized quality index, said transforming of said scores being established from raw data representing at least some of said insurance policies into output signals for display dynamically as a predictive index of said normalized insurance quality index further including the process comprising:
   (i) refreshing, with use of said server system controller, said scores to account for any recent changes relevant to said insurance policies; and
   (ii) projecting, with use of said server system controller, profitability by national level from at least the following differences including: differences in discount policies, differences between books of business, different writing companies, different premiums, projected profitability by territory, projected loss ratio, and different territory within a state so as to provide an output of a predicted desirability of said at least some of said insurance policies from said step of projecting profitability, said transforming further comprising the steps of:
   inputting at least one score for a set of policies;
   normalizing said scores within said set of policies across at least a premium variable;
   calculating a combined ratio of said set of policies;
   calculating percentiles of said combined ratio of said set of policies;
   establishing groupings according to said percentiles; and
   establishing an index signifier for each of said groupings; and
   outputting, with use of said server system controller, into a visual depiction, said normalized insurance quality index for appropriate human interaction, said outputting further comprising at least the steps of providing said output of said predicted desirability of said at least some of said insurance policies, and assessing, by an underwriter according to said predicted desirability of said at least some of said insurance policies, at least some of said insurance policies for either issuance, re-tiering, or non-renewal.

18. The process of claim 17, wherein said step of establishing groupings according to said percentiles is done so as to render a maximized number of groupings from said percentiles in accordance with system processing and actuarial dataset credibility constraints.

19. The process of claim 18, further including the step of managing the renewal of individual policies within said set of policies based upon said groupings and said index signifier for each of said groupings.

* * * * *